Jan. 28, 1969

C. E. COHN 3,424,653

METHOD FOR START-UP OF A NUCLEAR REACTOR
UTILIZING A DIGITAL COMPUTER

Filed June 8, 1967

INVENTOR.
Charles E. Cohn
BY
Attorney

United States Patent Office 3,424,653
Patented Jan. 28, 1969

3,424,653
METHOD FOR START-UP OF A NUCLEAR REACTOR UTILIZING A DIGITAL COMPUTER
Charles E. Cohn, Clarendon Hills, Ill., assignor to the United States of America as represented by the United States Atomic Energy Commission
Filed June 8, 1967, Ser. No. 645,569
U.S. Cl. 176—22  3 Claims
Int. Cl. G21c 7/06

ABSTRACT OF THE DISCLOSURE

A method of control for the start-up of a nuclear reactor employing a digital computer in the feedback loop by sampling of the reactor flux at predetermined time intervals, step adjustment of the reactor control rod in response to the difference between a computed desired flux value and an extrapolated flux value on the logarithmic slope between the two most recent flux samples, and adjustment of the deadband of the control system, as equilibrium is approached, to maintain the amount of rod jitter, or random motion, within predetermined limits.

Contractual origin of the invention

The invention described herein was made in the course of, or under, a contract with the United States Atomic Energy Commission.

Background of the invention

This invention relates to a method of control for the start-up of a nuclear reactor. More particularly, this invention relates to a method of controlling start-up of a nuclear reactor employing a digital computer in the control loop.

The substitution of a digital computer for the human operator in the control loop of a nuclear reactor during start-up raises problems necessarily different from those of a conventional system. Perhaps the most apparent differences between a conventional system, employing a human operator, and a digital computer control system are the manner in which the two systems receive information from the reactor and the manner in which the two systems control the reactor. The conventional control system samples information from the reactor continuously and provides for a continuous adjustment of the reactor in accordance with a predetermined scheme. In a digital computer control system, information from the reactor is sampled discretely and control of the reactor by the digital computer is in the form of a series of discrete step adjustments. Therefore a method of controlling the start-up of a reactor employing a digital computer in the control loop cannot be a mere simulation of the human operator; such a method must be based on the discrete mode of operation which is inherent of a digital computer.

Furthermore, a method of control underlying such a computerized reactor control system must include ways to optimize control during the rise and leveling-off of the reactor output power. For example, during the rise of the power output of the reactor, the time required to reach a desired power level consistent with safety is the important control criterion; once a desired demand power level has been reached, control of the system gain to prevent jitter in the control rod motion might be the important control criterion.

It is therefore the main object of the present invention to provide a method for controlling start-up of a nuclear reactor that takes advantage of the capabilities of a digital computer in the control loop.

It is another object of the present invention to provide a method for establishing a demand trajectory for the reactor flux that is attainable with the computer control means at hand.

It is yet another object of the present invention to provide a method for establishing a value representing the width of the deadband of the control system.

It is a further object of the present invention to provide a control method for adjusting the deadband of the control system as a desired power output level is approached.

Summary of the invention

The present invention is directed to a method for controlling the start-up of a nuclear reactor having a digital computer in the control loop.

In particular, each sample of reactor flux taken at predetermined periodic time intervals T is converted to an equivalent binary representation and transferred to a digital computer. During each time interval T the digital computer examines the flux behavior and determines the difference between the extrapolated flux value computed from the logarithmic slope of the two most recent flux samples and a computed desired flux value at the end of each time interval T. If the difference $\epsilon$ falls within a deadband value D, the reactor control rod is left stationary; if the difference $\epsilon$ exceeds the deadband D, the reactor control rod is moved by a discrete amount and in the direction necessary to effect a change in the reactor flux level such that the reactor flux level at the beginning of the next sampling interval approaches the computed desired flux level more closely.

The net control rod motion over predetermined time segments is computed and the deadband D is adjusted to obtain a system gain such that the amount of random control rod motion will be within predetermined limits.

Brief description of the drawings

A more complete understanding of the invention will best be obtained from consideration of the accompanying drawings in which:

FIG. 1 shows a nuclear reactor 2 with a flux level detector 4 such as a conventional current ionization chamber. A conventional voltage-to-frequency converter 6 is connected to the output of the flux detector 4. The output of the voltage-to-frequency converter 6 is connected to the input of a conventional electronic binary counter 8. The contents of the counter 8 are transferred to the input of a digital computer 12 in response to the output of a conventional clock pulse generator 10 which is adjusted to emit a clock pulse at 0.1 second intervals. The output of the clock pulse generator 10 is further connected to a control input of the digital computer 12. The output of the digital computer 12 is connected to an actuator circuit 14 which energizes control rod 16 in response to an output signal from the digital computer 12.

Figure 1:
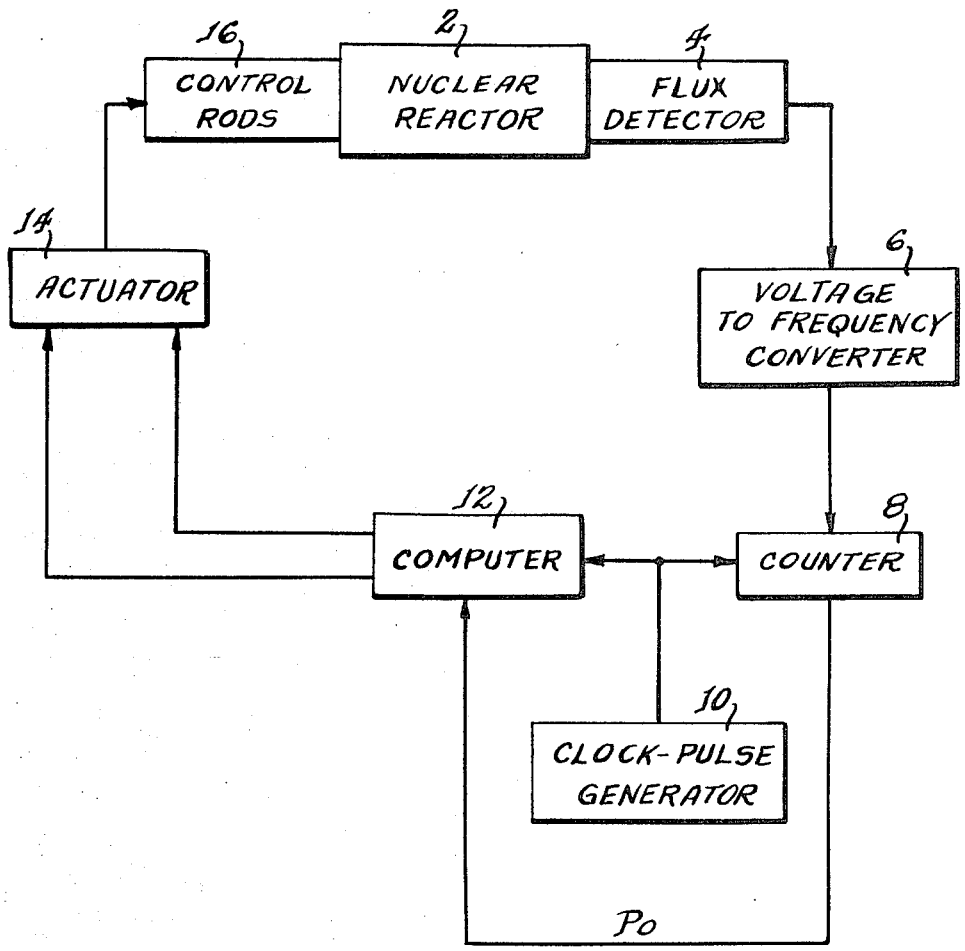
FIG. 1 is a block diagram of a control system for the practice of the invention.

In the operation of FIG. 1, the flux level detector 4 senses the neutron flux level in the reactor 2 and generates a continuous output voltage proportional to the instantaneous neutron flux. The voltage-to-frequency converter 6 continuously generates a train of pulses whose frequency is proportional to the amplitude of the output voltage of the flux detector 4. The output pulses of the voltage-to-frequency converter 6 are accumulated in the counter 8. The binary contents P of the counter 8 (hereinafter referred to as a flux sampling), representing the number of pulses accumulated during a time interval of 0.1 second, are transferred to the input of the digital computer 12 and the counter 8 is reset in response to each output pulse of the clock pulse generator 10. The time interval of 0.1 second will hereinafter be referred to as a sampling interval T. In addition, each output pulse of the clock pulse generator 10 alerts the digital computer 12 that a flux sampling from the counter 8 is being transferred to its input. The computer 12 processes the incoming flux samplings, in a manner to be described hereinafter, in response to each output pulse of the clock pulse generator 10, to determine whether or not the control rod 16 is to be moved, and if so, in what direction.

Figure 2:
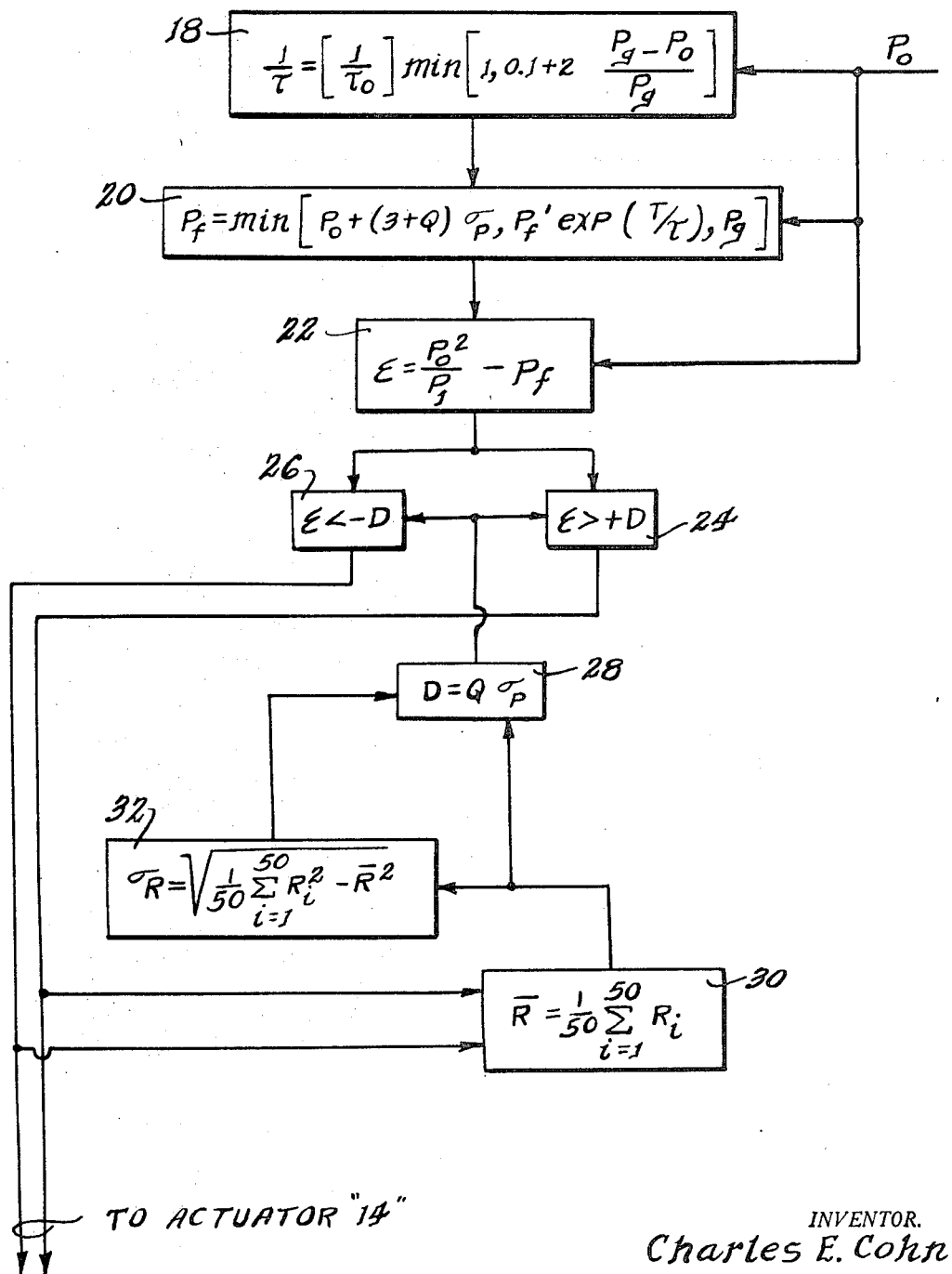
FIG. 2 is a block diagram illustrating the functions of the steps in the reactor control method of the present invention.

FIG. 2 is a block diagram graphically illustrating the sequence of computations which are performed by the digital computer 12 to effect control of the nuclear reactor 2 in FIG. 1.

The first function of the computer is to establish a demand trajectory for the reactor flux that is attainable with the control means at hand and that results in acceptable operation. The simplest demand trajectory is an exponential rise on a predetermined demand period followed by a leveling-off at a predetermined demand power. However, such a trajectory would cause problems at the time of transition since limitations on control rod speed make it impossible to remove reactivity fast enough to level off abruptly from a reasonable period without overshoot. Therefore it is desirable to lengthen the demand period as the predetermined demand power is approached in order to limit the rates of reactivity removal needed.

To accomplish this, the computer, as schematically indicated at 18 in FIG. 2, calculates during each sampling interval T a demand period $\tau$ according to the expression:

$$\frac{1}{\tau} = \left[\frac{1}{\tau_0}\right] \min\left[1, 0.1 + 2\frac{P_g - P_0}{P_g}\right] \quad (1)$$

wherein $\tau_0$ = a predetermined basic demand period
$P_0$ = the flux sampling at the beginning of each sampling interval
$P_g$ = a predetermined demand power.

The resulting demand period $\tau$ is thus maintained equal to $\tau_0$ up to half demand power, and then is smoothly lengthened to ten times $\tau_0$ at demand power.

Having calculated $\tau$ according to Expression 1, the computer, as indicated at 20 in FIG. 2, next calculates the flux value $P_f$ of the demand trajectory at the beginning of the next sampling interval according to the expression:

$$P_f = \min[P_0 + (3+Q)\sigma_p, P_f' \exp(T/\tau), P_g] \quad (2)$$

wherein $P_0$, $P_g$, T and $\tau$ are as defined hereinbefore and

Q = a factor initially equal to 1.5, but subject to a change in value as described hereinafter
$\sigma_p$ = estimated standard deviation of the flux sampling $P_0$ resulting from the inherent statistical fluctuations in the neutron flux
$P_f'$ = the calculated flux value of the demand trajectory at the beginning of the present sampling interval.

The first argument, $P_0 + (3+Q)\sigma_p$, in Expression 2 insures that $P_f$ will not diverge too far from $P_0$ in the beginning of the start-up when the reactor flux is rising much more slowly than the demand, and thus prevents an excessively rapid rise later when the flux would attempt to catch up. The exponential in the second argument, $P_f' \exp(T/\tau)$, in Expression 2 is multiplied by $P_f'$ instead of $P_0$ to insure that $P_f$ will rise smoothly, unaffected by the statistical fluctuations in $P_0$.

The second function of the computer is to compare the incoming reactor flux samplings with the calculated demand trajectory and to determine whether or not the reactor control rod is to be moved to minimize the difference between the actual reactor flux trajectory and the calculated demand trajectory.

As schematically indicated at 22 in FIG. 2, the comparison of the incoming samples and the calculated demand trajectory is performed by calculating the difference $\epsilon$ between the extrapolated flux value $P_2$ on the logarithmic slope between the two most recent flux samplings $P_0$ and $P_1$ and the calculated flux value $P_f$ on the calculated demand trajectory at the beginning of the next sampling interval according to the equation:

$$\epsilon = \left(\frac{P_0^2}{P_1}\right) - P_f \quad (3)$$

Equation 3 is derived as follows: $\epsilon$ is defined by the relation.

$$\epsilon = P_2 - P_f \quad (4)$$

and $$\ln P_2 = \left[\frac{\ln P_0 - \ln P_1}{T}\right] T + \ln P_0 \quad (5)$$

or $$\ln P_2 = \ln\left(\frac{P_0^2}{P_1}\right) \quad (6)$$

which gives $$P_2 = \frac{P_0^2}{P_1} \quad (7)$$

and Equation 3 follows by substituting $P_0^2/P_1$ for $P_2$ in Equation 4.

During each sampling interval, $\epsilon$ is compared with a value D representing the deadband of the system. As schematically indicated at 24 in FIG. 2, if $\epsilon$ is greater than the deadband D, the computer generates an output pulse having a time duration equal to the sampling interval T which is transmitted to the actuator circuit 14 in FIG. 1 to effect a one step withdrawal of the control rods, for the time duration T. As schematically indicated at 26 in FIG. 2, if $\epsilon$ is less that $-D$ an output pulse having the same time duration T is generated by the computer which is transmitted to the actuator circuit 14 to effect a one step insertion of the control rod for the time duration T. If $\epsilon$ is between $-D$ and $+D$, no pulse is transmitted to the actuator circuit 14.

In the foregoing description, the control rod 16 has been assumed to be of such character, e.g. a fissionable material containing element such as is normally used to control a fast reactor, that insertion thereof into the reactor increases the reactor reactivity and withdrawal thereof into the reactor decreases the reactor reactivity. If the control rod 16 were of a character such as to increase reactivity upon withdrawal thereof, e.g. a boron containing rod used to control thermal reactors, the direction of control rod response to $\epsilon$ would be the inverse of that described above.

During each sampling interval the computer, as schematically indicated at 28 in FIG. 2, establishes the deadband D according to $$D = Q\sigma_p \quad (8)$$

wherein Q and $\sigma_p$ are as defined hereinbefore.

After a time duration of fifty sampling intervals has occurred, the computer, as schematically indicated at 30 in FIG. 2, calculates the net rod motion $\bar{R}$ during that time duration according to the expression:

$$\bar{R} = \frac{1}{50} \sum_{i=1}^{50} R_i \quad (9)$$

wherein $R_i$ = equal to $+1$, 0, or $-1$ if the control rod is inserted, not moved, or withdrawn, respectively, during each sampling interval.

If the magnitude of $\bar{R}$ is less than 0.1, indicating a net rod motion of five steps or less out of fifty, a quantity $\sigma_R$ representing a measure of the jitter in the control rod motion is calculated by the computer, as schematically indicated at 32 in FIG. 2, according to the expression:

$$\sigma_R \sqrt{\frac{1}{50} \sum_{i=1}^{50} R_i^2 - \bar{R}^2} \qquad (10)$$

If $\sigma_R$ is greater than 0.2, indicating that the control rod was being mover randomly more than one-fifth of the time, the factor Q is increased by 10%, thereby increasing the deadband D by the same percentage. If $\sigma_R$ is less than 0.05, indicating that the control rod was being moved randomly less than one-twentieth of the time, the factor Q is decreased by 10%, thereby decreasing the deadband D by the same percentage. Thus the computer calculates a system gain such that the amount of random motion will be within the above limits. If $\bar{R}$ is not less than 0.1 indicating a non-equilibrium situation, Q is decreased by 10% but is never allowed to fall below the initial value of 1.5, so that the system gain is maintainted at a high level in such a case.

Persons skilled in the art will, of course, readily adapt the general teachings of the invention to methods other than the specific methods illustrated. Accordingly the scope of the protection afforded the invention should not be limited to the particular method shown in the drawings and described above, but shall be determined only in accordance with the appended claims.

The embodiments of the invention in which an exclusive property or privilege is claimed are defined as follows:

1. In a digital start-up method for bringing a nuclear reactor up to a final predetermined desired neutron flux level $P_g$, wherein, at consecutive equal time intervals T, a current neutron flux sampling $P_0$ is taken, a value for the succeeding neutron flux sampling $P_2$ is projected from the current flux sampling $P_0$ and at least one preceding flux sampling, the value $P_2$ is compared with a succeeding demand flux value $P_f$ to provide a difference $\epsilon$, and a reactor control rod is moved one discrete step in a direction to reduce the difference $\epsilon$ if the absolute magnitude of the difference exceeds a deadband value D, the improvement which comprises obtaining values, taken over a time segment consisting of a predetermined number of time intervals, representative of the net motion and the random motion, respectively, of said control rod, and adjusting the deadband value D for the succeeding time segment in response to said respective values.

2. The method of claim 1 wherein the value representative of the net motion is the mean $\bar{R}$ of the steps per time interval and the value representative of the random motion is the standard deviation $\sigma_R$ of the steps per time interval.

3. The method of claim 2 wherein said deadband value D is decreased by a predetermined percentage if said value $\bar{R}$ is greater than a first predetermined constant and said deadband value D is larger than a predetermined initial value;

said deadband value D is also decreased by said predetermined percentage if said value $\bar{R}$ is smaller than said first predetermined constant and said value $\sigma_R$ is smaller than a second predetermined constant; and said deadband value D is increased by said predetermined percentage if said value $\bar{R}$ is smaller than said first predetermined constant and said value $\sigma_R$ is greater than a third predetermined constant, where said third predetermined constant is greater than said second predetermined constant.

References Cited

IRE Transactions on Nuclear Science, vol. NS–8, 1961, No. 3, pp. 1–12, "A Digital Start-up Control Unit For Nuclear Reactors," by Schmidt et al.

IEEE Transactions on Nuclear Science, vol. NS–12, No. 4, 1965, pp. 335–366, "Digital Start-up Control of a Research Reactor," by Takahashi et al.

AIEE Transactions, vol. 79, Part 1, 1960, pp. 369–375, "A Digital Start-up Control for Air-Cooled Nuclear Reactors," by Lehr et al.

LELAND A. SEBASTIAN, *Primary Examiner.*

H. E. BEHREND, *Assistant Examiner.*

U.S. Cl. X.R.

176—19